United States Patent [19]

Selby, III et al.

[11] 4,336,115

[45] Jun. 22, 1982

[54] ACID BASE PRODUCTION UNIT

[75] Inventors: Howard W. Selby, III; Paul C. Melanson, both of Boulder, Colo.

[73] Assignee: PureCycle Corporation, Boulder, Colo.

[21] Appl. No.: 209,485

[22] Filed: Nov. 24, 1980

Related U.S. Application Data

[63] Continuation of Ser. No. 86,179, Oct. 18, 1979, abandoned.

[51] Int. Cl.$^3$ .................... C25B 1/16; C25B 1/26; C25B 15/08
[52] U.S. Cl. .................... 204/98; 204/258
[58] Field of Search .................... 204/98, 257, 258

[56] References Cited

U.S. PATENT DOCUMENTS

| | | | |
|---|---|---|---|
| 3,390,065 | 6/1968 | Cooper | 204/95 |
| 3,547,810 | 12/1970 | Cooper | 210/62 |
| 3,901,774 | 8/1975 | Motani | 204/98 |
| 4,169,775 | 10/1979 | Kuo | 204/98 |

Primary Examiner—T. M. Tufariello
Attorney, Agent, or Firm—Woodcock, Washburn, Kurtz, Mackiewicz & Norris

[57] ABSTRACT

The production of acid and base is effected by the electrolysis of a metal halide salt solution across an ion-exchange membrane. The base is removed directly from the cathode and the hydrogen and halogen gases produced at the electrodes are reacted in a catalytic column to form the acid. This gas is absorbed by water to form an aqueous hydrogen halide acid solution. Such a system can be operated automatically and on a small scale.

8 Claims, 1 Drawing Figure

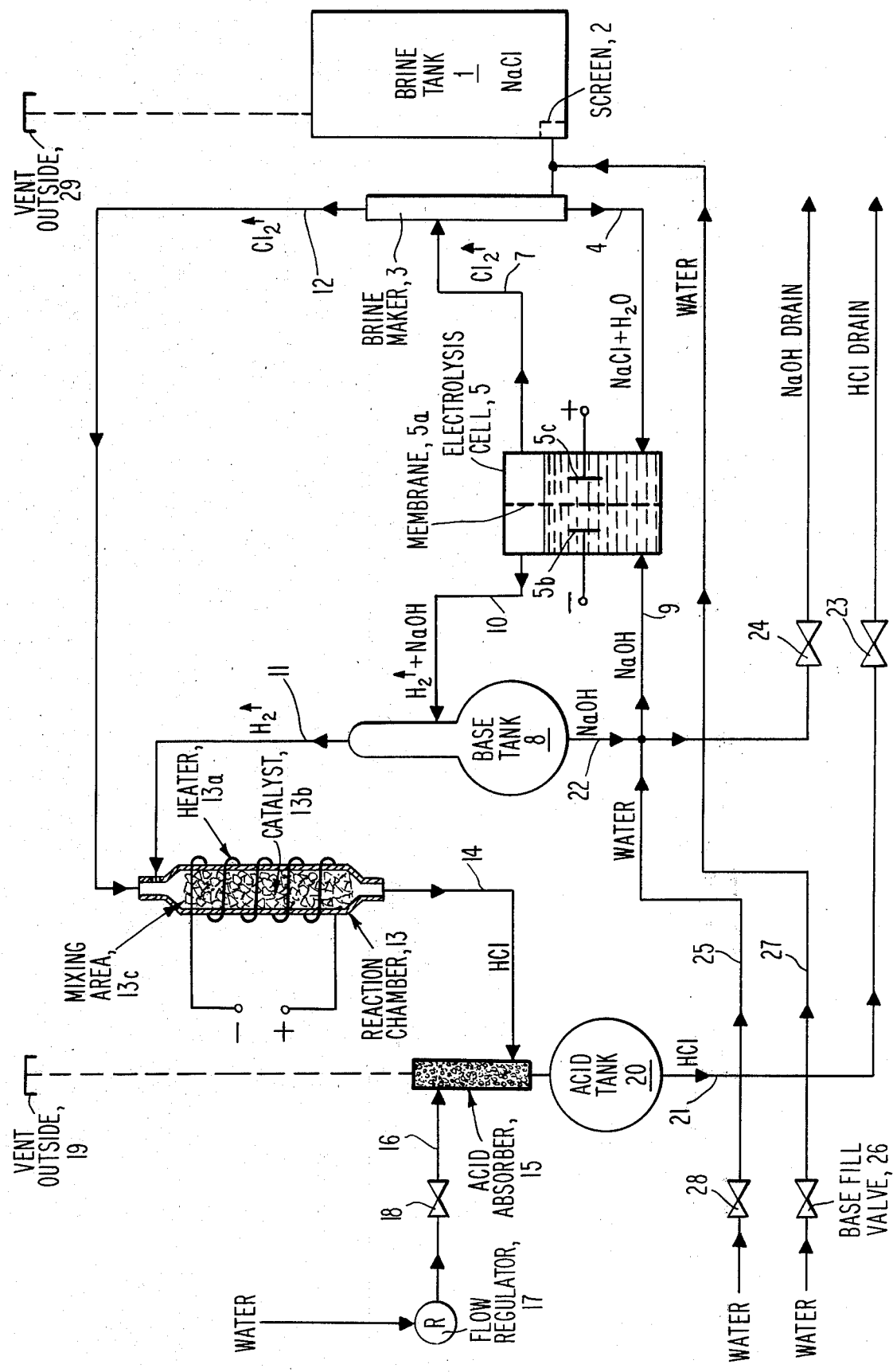

ACID BASE PRODUCTION UNIT

This is a continuation of application Ser. No. 086,179, filed Oct. 18, 1979 now abandoned.

BACKGROUND OF THE INVENTION

Chlorine and caustic (sodium or potassium hydroxide) are commercially produced by the electrolysis of sodium or potassium chloride. This can be done in a variety of cell configurations, one of which is a diaphragm cell utilizing a semi-permeable cation exchange membrane. In such case, sodium chloride solution may be provided to the area of an anode which is separated by the membrane from an cathode, to which is supplied pure water. The sodium ions cross the membrane, the chloride ions oxidize at the anode to form chlorine gas, and water is reduced at the anode to form hydrogen and hydroxide gas ions; the hydrogen ions combine to form hydrogen gas, and the hydroxide ions and sodium ions combine to form NaOH, resulting in the net production of sodium hydroxide solution, and hydrogen and chlorine. The ionization of water requires that power be supplied to the electrodes at a sufficient potential (greater than 1.9 V.D.C.) and at the correct current for the desired production rate. Additional process variables include the temperature of the solution, current density on the electrodes, and water and brine flow. The caustic solution is suitable for use directly, although it can be diluted, concentrated or fused dependent on the eventual use. The hydrogen and chlorine are usually compressed, liquified, dried, purified or otherwise treated for convenient handling. These may be either marketed directly or hypochlorite solution may be manufactured by addition of chlorine to the basic solution. The compressed gasses can also be metered to a combustion chamber for the production of hydrochloric acid gas. Usually this is done in a jet with a hydrogen-oxygen pilot flame to insure combustion and a slight (2–5%) excess of hydrogen to insure a chlorine free product. The HCl thus produced then can be absorbed into water to form an aqueous solution, or may be used as a gas. Excess hydrogen can be recycled or mixed with air and vented. Safety equipment must be supplied in the combustion chamber to prevent or vent explosions.

Other methods for the electrolysis of salt or salt solutions are possible, as are alternate methods of hydrochloric acid production. The hydrogen and chlorine can be mixed in equal proportion and brought into contact with incandescent platinum or carbon as a flame initiator and catalyst. Other work has been done using metallic chloride salts such as $AlCl_3$ or $CaCl_2$ on a quartz support material as a catalyst at elevated gas temperatures. Pure quartz or alumina can be used at even more elevated temperatures, platinum at lesser temperatures.

Review of caustic-chlorine production can be found in "The Encyclopedia of Chemical Technology", second edition, volume one pp 671–707. Hydrochloric acid production from hydrogen and chlorine is reviewed in volume two, of the same work, page 313. Catalytic methods for hydrogen and chlorine combination are given in "The Explosionless Combustion of Chlorine and Hydrogen to Form Hydrochloric Acid with the Aid of Contact Substances", B. Neumann, Zietschrift for Angewandte Chemie., 34, pp 613–620 (1921).

SUMMARY OF THE INVENTION

Halogen gas, hydrogen gas and alkali metal hydroxide are produced by passing an electric current through a solution of alkali metal halide in an anodic compartment separated by a permselective cation-exchange membrane from a cathodic compartment. Alkali metal halide solution is continually provided to the anode which is of an inert conductive material and water is provided to the cathode. Alkali metal hydroxide solution is produced in the cathodic compartment, while hydrogen is removed from the catholyte and chlorine removed from the anolyte; these maybe reacted directly on a heated polyvalent metal chloride or other catalyst and then absorbed as a hydro-halogen acid solution in water.

The use of the permselective membrane in the electrolysis cell provides many advantages. It does not introduce asbestos or mercury into the solutions' environments as is done in conventional chlorine-caustic cells. Instead of these prior art materials, the anode may consist of a nonconsumable, reduction resistant, dimensionally stable, conductive material, such as platinum plated copper or titanium. Similarly, the cathode may be a chlorine, oxidation and brine resistant, nonconsumable dimensionally stable, conductive material, such as steel or nickel. The compartment is divided in two by a synthetic polymer membrane. The membrane is a cation-exchange (i.e. a cation permeable) material manufactured for such cells, such as Nafion (A DuPont trademark) perfluorosulfonic acid membrane. In operation the alkali metal halide salt is ionized in solution and the halide is oxidized to halogen gas at the anode. The alkali metal ions are drawn through the membrane to the cathodic compartment where water is being converted to hydrogen and hydroxide at the cathode. The resulting process is very current efficient and produces alkali metal hydroxide solution of high purity. Cells with the synthetic membrane and dimensionally stable electrodes also result in significantly lower capital and maintenance costs than the conventional mercury or diaphragm cell.

The separation of the gasses from the catholyte and anolyte can be used to circulate the respective solutions using a bubble pump. A vertical column is provided above the electrodes and the rise of the gas motivates the surrounding fluid. As fresh fluid must constantly be provided to the electrodes to prevent concentration problems, this is a convenient method to circulate fluid. Other methods of pumping can of course be used.

The method described above insures equal production of gasses at the electrodes. It is found that with the synthetic membrane, the purity of the hydrogen is excellent and that of the halogen gas 98% or better, oxygen making up the difference. These are provided directly to the catalytic reaction compartment, the electrolysis current controlling the amount of gas produced.

If suitable catalysts are used and an adequately high temperature is reached, the reaction can proceed to completion. Useful catalysts include most polyvalent metal halides, platinum and other noble metals, and carbon. The optimum temperature varies with the catalyst, but in most cases 400° C. is sufficient. The HCl reaction cell can be quite small, making the results of an explosion of unreacted gasses less severe, and may comprise a fused silica or ceramic tube surrounded by a heater and filled with the catalyst. The catalyst can be on a support material which is acid resistant, such as silica. Most of the reaction will take place as a result of direct combustion between the gasses, so the mixing should take place within the heated region. The presence of the catalyst in this region insures steady combustion, thus preventing explosions and pressure oscillations. With proper contact, 100% conversion of the gasses to acid can be achieved.

The acid gas resulting from the reaction of the halogen and hydrogen may be absorbed in water using any one of a number of techniques. A useful process is spraying water down a packed column to contact the gas which is passed upward. Using this technique, acid of any concentration can be achieved by regulation of the gas and water flow rates. Other methods where a sufficient surface area of non-saturated water is provided will also suffice for acid absorption. A review of suitable contact methods is provided in "Chemical Engineers Handbook", fifth edition, Chapter 18, McGraw-Hill.

Should excess chlorine in the resultant acid solution become a problem, this can be solved by a variety of purification proceedures, such as contact with activated carbon, or by the addition of a sulfite salt or hydrogen sulfide. The amount of chlorine in the acid depends on the method of catalysis and the process temperature. If for example, carbon were used as the catalyst and a source of reduction in the reactor tube, chlorine can be virtually eliminated. A large quantity of polyvalent metal chloride and water vapor in saturation in the gasses at 400° C. also works well in this respect. The final acid can be pure as is desired; other contaminents are negligible.

The invention will be better understood if reference is made to the accompanying drawing, which shows a schematic view of apparatus for the practice of the process of the invention.

DESCRIPTION OF A PREFERRED EMBODIMENT

Sodium chloride salt is contained in a large, gas tight reservoir (1). This is separated by a screen (2) from another reservoir which holds salt in solution only (3). Salt exchanges across the screen (2) due to the differences in specific gravity of concentrated and more dilute salt solutions. The solution out of this second tank, or brine maker (3), is fed by a line (4) to the bottom of the anodic compartment of the electrolysis cell (5). Cell (5) comprises two compartments separated by a permselective cation exchange membrane (5a), a cathode of steel or some other reduction resistant conductive material (5b), and an anode of platinum plated titanium or other chlorine and brine resistant material (5c). Current is supplied to the cell (5) at approximately 3.5 V.D.C. from a power supply (not shown) while there is water in the cathodic compartment of the cell. Chlorine, hydrogen and sodium hydroxide are produced, as sodium chloride is consumed. The chlorine produced passes from the top of the anodic compartment of the cell through a line which contains a conventional bubble pump in a vertical section (7) of its length. This pump circulates the depleted brine solution back to the brine maker (3) where the chlorine is separated by gravity; in this way more sodium chloride is added to the brine.

The hydrogen produced at the cathode (5b) motivates the sodium hydroxide solution in a similar way. A reservoir or base tank (8) is initially filled with water. This enters the bottom of the anodic compartment of the electrolysis cell by a line (9) and is pumped around by a conventional bubble pump in a vertical section of the return line (10). Sodium hydroxide is added by the action of the cell and hydrogen gas is separated by gravity at the tank (8). This sodium hydroxide solution is used upon completion of an operating cycle, directly from this tank (8).

A current sensor located in the power supply may be used to control the current supplied to the cell by means of a potential variation. Desirably, the power supply is of a stepping type where a multitude of unregulated voltages can be switched on and off to limit the current to a predetermined range. This controls the flow of gasses from the anolyte and catholyte and allows the process to be terminated at a specific accumulated current which will correspond to a specific amount of sodium hydroxide, hydrogen and chlorine.

The hydrogen and chlorine are transported by two resistant lines (11, 12) to the Reaction Chamber (13), which comprises a tubular body surrounded by a heater (13a) and filled with a catalyst (13b). The catalyst is an inert silica-alumina support material coated with aluminum chloride. The alumina in the support should also provide a continuously renewable source of catalyst material should that supplied at start-up be carried off. The gasses are mixed in the tube in a mixing area (13c) which can be a simple jet, and are introduced immediately to the heated catalyst. Temperature must be maintained above 350° C. Conversion of the hydrogen and chlorine to HCl is virtually complete; any remaining chlorine may be absorbed on a bed of activated carbon.

Hydrogen chloride then flows from the reaction cell via a resistant line (14) to the bottom of a packed absorption column (15). Water is introduced at a controlled rate through a line at the top of the column (16) controlled by a flow regulator (17) and a valve (18). The column is vented to the atmosphere (19); in this way, acid of a controlled concentration is manufactured in the acid absorber (15), and may be collected in the acid tank (20).

After use of the acid and base, which can be collected by the drain lines (21, 22) and controlled by drain valves (23, 24), water is replaced in the base valve via a fill line (25) and valve (28). Water is also replaced in the brine tank via a line (27) and valve (26) as a small amount is lost during electrolysis. The brine tank (1) is vented through the top (29) to allow this addition. This plant is now ready for another electrolysis cycle.

Salt must be added to the brine tank (1) on a regular basis as it is depleted. However, if tank (1) is sufficiently large, this can be on a long term basis. The membrane (5a) will have to be replaced or reconditioned as recommended by the manufacturer.

It will be appreciated that there has been described apparatus and a process for the production of acid and basic solutions which are at once simple and eminently suitable for the achievement of the goals discussed above, in that pressurized process flow nor complex material devices are not required. It is the novel combination of electrolytic production of hydrogen and chlorine and catalytic reaction thereof in a batch process which makes these advantages realizable. Furthermore, the fact that the electrolysis is performed at essentially ambient pressures permits the use of simple non-mechanical bubble pumps to drive the various process streams. Therefore, it will be appreciated that the scope of the invention should not be limited by the description given above, which is merely explanatory, but only by the following claims.

We claim:

1. An acid base production system utilizing alkali metal halide salts and water as raw materials comprising:
   (a) an electrolysis cell for production of alkali metal hydroxide solution, halogen gas and hydrogen from a solution of said salt in water, comprising a permselective cation-exchange membrane and electrodes disposed on either side of said membrane for supply of direct current to said solution;
   (b) a reaction chamber for containing a catalyst selected from the group consisting of the noble metals, silica, alumina and the polyvalent metal chlorides for the catalytic reaction of said halogen and hydrogen to form hydrogen halide, comprising means for heating said catalyst to a temperature such that said reaction proceeds without violent combustion; and
   (c) means for absorption of said hydrogen halide in water to produce aqueous acid solution.

2. The system of claim 1 whereby said solutions are circulated through said electrolysis cell using the rise of the produced gasses as the motivating force.

3. The system of claim 1 wherein the electrolysis cell is maintained at ambient temperature and pressure.

4. The system of claim 1 wherein means are provided for removing trace elemental halogen from the acid solution.

5. The system of claim 1 further comprising means for production of alkali metal halide solution from solid alkali metal halide salt.

6. The system of claim 1 further comprising means for replenishing said salt in said electrolysis cell.

7. Method of production of acid and base comprising the steps of:
   supplying alkali metal halide solution to a vessel comprising an ion exchange membrane;
   supplying a potential difference to electrodes disposed in said vessel on opposing sides of said membranes, whereby a basic alkali metal solution is formed in said vessel; collecting liberated halide and hydrogen gases from said vessel; and
   mixing said halide gas and hydrogen in the presence of a heated catalyst, whereby said halide gas and hydrogen react without violent combustion to form an acid.

8. The method of caim 7 further comprising the step of causing the product of said reaction to be absorbed in water to form an acid solution.

* * * * *